(12) United States Patent
Bernstein

(10) Patent No.: US 6,615,185 B1
(45) Date of Patent: Sep. 2, 2003

(54) METHOD FOR THE PURCHASE OF USED REMOVABLE MEDIA OVER THE INTERNET WITHOUT DISCLOSING INDIVIDUAL PRICES

(76) Inventor: Stan Bernstein, 40 Bobcat Springs Rd., Beullton, CA (US) 93427

( * ) Notice: Subject to any disclaimer, the term of this patent is extended or adjusted under 35 U.S.C. 154(b) by 0 days.

(21) Appl. No.: 09/490,244

(22) Filed: Jan. 24, 2000

Related U.S. Application Data

(60) Provisional application No. 60/150,610, filed on Aug. 24, 1999.

(51) Int. Cl.[7] .............................................. G06F 17/60
(52) U.S. Cl. .......................................... 705/26; 705/27
(58) Field of Search ..................... 705/26, 27

(56) References Cited

U.S. PATENT DOCUMENTS

| | | | |
|---|---|---|---|
| 3,955,749 A | * | 5/1976 | Turkenkopf |
| 6,101,484 A | * | 8/2000 | Halbert et al. ................ 705/26 |
| 6,269,343 B1 | * | 7/2001 | Pallakoff |

FOREIGN PATENT DOCUMENTS

| | | | | |
|---|---|---|---|---|
| WO | WO 99/30293 | * | 6/1999 | ............. G07F/7/08 |

OTHER PUBLICATIONS http://BigEmma.com.*
http://CashForCDs.com.*
Citibank Platinum Select Statement, Sep. 22, 1998.*
Korth et al "Database System Concepts", Second Edition, McGraw–Hill, Inc., 1991, pp. 87–89, 118–119, 527–528.*

Bobrowski, Steven "ORACLE7 Server Concepts Manual" Oracle Corporation, 1992, p. 9.* http://www.secondspin.com.* http://bestusedcds.com.*

Oliver, Dick "Teach Yourself HTML 3.2" Sams.net Publishing, 1997, pp. 232–248.*

* cited by examiner

*Primary Examiner*—Wynn W. Coggins
*Assistant Examiner*—Naeem Haq

(57) ABSTRACT

A system and method for the purchase of used compact disks and other mass market removable media over the Internet is disclosed, in which the potential seller accesses the purchaser's website and identifies the CDs to be sold from a searchable database. The seller quantifies the condition of the CDs to be sold using a ranking criteria specified on the website. An offer price for each CD is computed based upon a percentage of the original list price, discounted by the stated CD condition. The seller is required to enter more than a specified minimum number of titles before receiving a quote price; the quote price is a total transaction amount only, with the individual CD prices not displayed to the potential seller.

7 Claims, 11 Drawing Sheets

Group or Artist Found

File Edit View Go Communicator Help

@cashforcds.com

MY QUOTE
HELP

Home

My Quote
Click here to see
the CDs you have
selected to sell.

**Why sell those
used CDs?**
Not sure if you want to
sell your old CDs? Find
out why you should!

**What people are
saying about us!**
Unsolicited customer
comments

About Us
Who we are and how to
contact us

**Agreement Terms
and Conditions**
Please read this before
you place a quote

Group or Artist Found

Please select a Group or Artist from the list below.

♪ NASCIMENTO*MILTON —— 302
♪ SHORTER*W/NASCIMENTO
♪ VAUGHN*S/NASCIMENTO

Not what you are looking for? Try a new search below:

FIND AN ENTRY FOR THE CD YOU WANT TO SELL BY ENTERING ONE OF THE FOLLOWING:
- GROUP NAME OR
- ARTIST NAME (LAST NAME ONLY) OR
- CD TITLE (FIRST FEW LETTERS OF THE TITLE, SUCH AS "BLONDE ON BL")

| Group or Artist ▶ | | Search |

Fig. 3

Titles Found cashforcds.com

MY QUOTE
HELP

File Edit View Go Communicator Help

Home

My Quote
Click here to see the CDs you have selected to sell.

Why sell those used CDs?
Not sure if you want to sell your old CDs? Find out why you should!

What people are saying about us!
Unsolicited customer comments

About Us
Who we are and how to contact us

Agreement Terms and Conditions
Please read this before you place a quote

Titles Found

Select a Title from the list below or search for new CDs

♪ NASCIMENTO*MILTON/AMIGO
♪ NASCIMENTO*MILTON/ANGELUS
♪ NASCIMENTO*MILTON/ANIMA
♪ NASCIMENTO*MILTON/ART OF
♪ NASCIMENTO*MILTON/BRAZILIAN COLLECTION
♪ NASCIMENTO*MILTON/CLUBE DE ESQUINA 1
♪ NASCIMENTO*MILTON/MEETINGS & FAREWELLS
♪ NASCIMENTO*MILTON/MILAGRE DOS PEIXES
♪ NASCIMENTO*MILTON/MILTONS — 402
♪ NASCIMENTO*MILTON/MISSA DOS QUILOMBOS
♪ NASCIMENTO*MILTON/NASCIMENTO
♪ NASCIMENTO*MILTON/PLANETA BLUE NA ESTR
♪ NASCIMENTO*MILTON/SENTINELA(SENTINEL)
♪ NASCIMENTO*MILTON/TAMBORES DE MINAS
♪ NASCIMENTO*MILTON/TXAI
♪ NASCIMENTO*MILTON/YAUARETE

Fig. 4

Condition of the CD

@cashforcds.com

Home

My Quote
Click here to see the CDs you have selected to sell.

Why sell those used CDs?
Not sure if you want to sell your old CDs? Find out why you should!

What people are saying about us!
Unsolicited customer comments

About Us
Who we are and how to contact us

Agreement Terms and Conditions
Please read this before you place a quote

MY QUOTE
HELP

Condition of the CD: MILTONS

Select the condition of the actual CD itself (the cover(s) must be in Excellent or Good condition)

○ Excellent — No marks/mirror finish.
● Good — A small light scuff/mark or two.
○ Fair — Many light marks/scratches, generally scuffed.
○ Missing Back Cover — Regardless of condition, the CD is missing the back cover (under the tray).

503

[NEXT>]

Not what you are looking for? Try a new search below:

FIND AN ENTRY FOR THE CD YOU WANT TO SELL BY ENTERING ONE OF THE FOLLOWING:
- GROUP NAME OR
- ARTIST NAME (LAST NAME ONLY) OR
- CD TITLE (FIRST FEW LETTERS OF THE TITLE, SUCH AS "BLONDE ON BL")

[Group or Artist ▼] [          ] [Search]

Fig. 5

| My Quote | | ▫ ⊡ ⊠ |
|---|---|---|
| File Edit View Go Communicator Help | | |

@cashforcds.com                                    MY QUOTE
                                                    HELP Home My Quote

My Quote
Click here to see
the CDs you have
selected to sell.

This is the list of CDs you want to sell.

- To remove an item from the list, click REMOVE THIS CD to the right of the CD you want to remove.
- To change the condition of the CD, simply click the current condition.
- Continue building your quote by searching for more items below.

Why sell those used CDs?
Not sure if you want to
sell your old CDs? Find
out why you should!

YOU MAY HAVE TO PRESS RELOAD OR REFRESH IF ALL OF YOUR CD'S ARE NOT SHOWING UP!

| GROUP/ARTIST | TITLE | CONDITION | |
|---|---|---|---|
| ⊙ NASCIMENTO*MILTON | MILTONS | Good | REMOVE THIS CD |

**What people are
saying about us!**
Unsolicited customer
comments

In order to maximize postage and processing, you must sell a minimum of 6 CDs at a time. *Come on! You know you have
a few more laying around, anyway!*
Please select more CDs to sell by entering an new search below:

About Us
Who we are and how to
contact us

FIND AN ENTRY FOR THE CD YOU WANT TO SELL BY ENTERING ONE OF THE FOLLOWING:
- GROUP NAME OR
- ARTIST NAME (LAST NAME ONLY) OR
- CD TITLE (FIRST FEW LETTERS OF THE TITLE, SUCH AS "BLONDE ON BL")

**Agreement Terms
and Conditions**
Please read this before
you place a quote

| Group or Artist ▸ | | Search |
|---|---|---|

Fig. 6

My Quote

@cashforcds.com

File  Edit  View  Go  Communicator  Help

MY QUOTE
HELP

Home

My Quote

My Quote
Click here to see the CDs you have selected to sell.

This is the list of CDs you want to sell.

- To remove an item from the list, click REMOVE THIS CD to the right of the CD you want to remove.
- To change the condition of the CD, simply click the current condition.
- Continue building your quote by searching for more items below.

Why sell those used CDs?
Not sure if you want to sell your old CDs? Find out why you should!

YOU MAY HAVE TO PRESS RELOAD OR REFRESH IF ALL OF YOUR CD'S ARE NOT SHOWING UP!

| GROUP/ARTIST | TITLE | CONDITION | |
|---|---|---|---|
| @ NASCIMENTO*MILTON | MILTONS | Good | REMOVE THIS CD |
| @ SIBERRY*JANE | NO BORDERS HERE | Excellent | REMOVE THIS CD |
| @ TYNER*MCCOY | ECHOS OF A FRIEND | Good | REMOVE THIS CD |
| @ WILLIAMS*JESSICA | INVENTIONS | Good | REMOVE THIS CD |

What people are saying about us!
Unsolicited customer comments

In order to maximize postage and processing, you must sell a minimum of 6 CDs at a time. *Come on! You know you have a few more laying around, anyway!*
Please select more CDs to sell by entering an new search below:

About Us
Who we are and how to contact us

FIND AN ENTRY FOR THE CD YOU WANT TO SELL BY ENTERING ONE OF THE FOLLOWING:
- GROUP NAME OR
- ARTIST NAME (LAST NAME ONLY) OR
- CD TITLE (FIRST FEW LETTERS OF THE TITLE, SUCH AS "BLONDE ON BL")

Agreement Terms and Conditions
Please read this before you place a quote

[Group or Artist ▼] [                    ] [Search]

Fig. 7

[My Quote]

@cashforcds.com

File Edit View Go Communicator Help

MY QUOTE
HELP

Home

My Quote
Click here to see the CDs you have selected to sell.

Why sell those used CDs?
Not sure if you want to sell your old CDs? Find out why you should!

What people are saying about us!
Unsolicited customer comments

About Us
Who we are and how to contact us

Agreement Terms and Conditions
Please read this before you place a quote

My Quote

This is the list of CDs you want to sell.

- To remove an item from the list, click REMOVE THIS CD to the right of the CD you want to remove.
- To change the condition of the CD, simply click the current condition.
- Continue building your quote by searching for more items below.

YOU MAY HAVE TO PRESS RELOAD OR REFRESH IF ALL OF YOUR CD'S ARE NOT SHOWING UP!

| GROUP/ARTIST | TITLE | CONDITION | |
|---|---|---|---|
| @ KRALL*DIANA | STEPPING OUT (1993) | Excellent | REMOVE THIS CD |
| @ NASCIMENTO*MILTON | MILTONS | Good | REMOVE THIS CD |
| @ SIBERRY*JANE | NO BORDERS HERE | Excellent | REMOVE THIS CD |
| @ TYNER*MCCOY | ECHOS OF A FRIEND | Good | REMOVE THIS CD |
| @ WILLIAMS*JESSICA | INVENTIONS | Good | REMOVE THIS CD |
| @ UPSHAW*DAWN | KNOXVILLE:SUMMER | Good | REMOVE THIS CD |

[GET QUOTE>] ← 802
or continue building quote by entering a new search below:

FIND AN ENTRY FOR THE CD YOU WANT TO SELL BY ENTERING ONE OF THE FOLLOWING:
- GROUP NAME OR
- ARTIST NAME (LAST NAME ONLY) OR
- CD TITLE (FIRST FEW LETTERS OF THE TITLE, SUCH AS "BLONDE ON BL")

[Group or Artist ▼] [      ] [Search]

Fig. 8 cashforcds.com

My Quote - Completed

Home

My Quote
Click here to see the CDs you have selected to sell.

Why sell those used CDs?
Not sure if you want to sell your old CDs? Find out why you should!

What people are saying about us!
Unsolicited customer comments

About Us
Who we are and how to contact us

Agreement Terms and Conditions
Please read this before you place a quote

| | GROUP/ARTIST | TITLE | CONDITION |
|---|---|---|---|
| @ | KRALL*DIANA | STEPPING OUT (1993) | Excellent |
| @ | NASCIMENTO*MILTON | MILTONS | Good |
| @ | SIBERRY*JANE | NO BORDERS HERE | Excellent |
| @ | TYNER*MCCOY | ECHOS OF A FRIEND | Good |
| @ | WILLIAMS*JESSICA | INVENTIONS | Good |
| @ | UPSHAW*DAWN | KNOXVILLE:SUMMER | Good |

Congratulations! You just made $15.00 for pointing and clicking! ← 902

Complete the information below. We'll send you a postage-paid mailer and checklist you can use to send the CDs to us. Once we get the CDs, we'll send you the money!

To complete the quote, tell us where to send the check. All information requested is required. You have our promise that *this information will not be used in any other way.*

FIRST NAME
LAST NAME
ADDRESS
CITY
STATE
ZIP CODE
EMAIL ADDRESS
PHONE NUMBER

BY ACCEPTING THIS QUOTE, YOU ACKNOWLEDGE YOU HAVE READ OUR AGREEMENT

[SEND ME MY MONEY!]

← 904

MY QUOTE
HELP

Fig. 9

METHOD FOR THE PURCHASE OF USED REMOVABLE MEDIA OVER THE INTERNET WITHOUT DISCLOSING INDIVIDUAL PRICES

RELATED APPLICATION

This application claims the benefit of my U.S. Provisional Application No. 60/150,610, filed Aug. 24, 1999.

FIELD OF THE INVENTION

This invention relates generally to systems and methods for electronic commerce over the Internet, and more specifically to a system and method for the purchase of used compact disks, and other mass-market removable media such as DVD's, from individual sellers.

RESERVATION OF COPYRIGHT RIGHTS

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

Electronic commerce over the Internet has increased rapidly over the past few years. Many different types of commerce are transacted over the Internet, and many different systems and methods have been implemented to carry out transactions. One area of commerce that has not been widely implemented on the Internet is the purchase of used mass-market items from individual consumers for resale, where the items may be of variable condition, and hence of variable purchase price.

One product for which there exists a substantial market for purchase and re-sell is music compact disks. Since compact disks generally maintain their sound quality with repeated playings, they maintain a significant value in the re-sell market. Unlike old phonograph records, the purchaser of a used CD need not be greatly concerned about degraded sound quality due to surface damage. Minor damage to the CD surface which may cause some CD players to skip can typically be buffed out by the reseller, restoring the CD to essentially "new" condition. A similar market exists for DVD's containing video programs.

A problem for the purchaser of used CDs is ascertaining the condition of the CDs, so that the offer price may be adjusted accordingly. A used CD in "excellent" condition, having no marks and a mirror finish, requires little effort on the part of the reseller and brings a higher price in the used CD market. A used CD with a damaged surface may require additional effort on the part of the purchaser to restore it to a usable condition, or may be of no value to the purchaser.

An additional problem for purchasers of used items from consumers for resale is that the consumer may wish to sell only a small number of the item, making it uneconomical for the purchaser. Thus there is a need for a system which allows the purchaser to buy used items from consumers for resale in quantities that make the transaction economically viable for the purchaser, and that adjust the offer price based on the condition of the items.

SUMMARY OF THE PRESENT INVENTION

Accordingly, it is the object of the present invention to provide a user-friendly "automatic quote" system for the purchase of used CDs and other mass-market removable media from individual consumers over the Internet.

It is an object of the present invention to provide a system for the purchase of used CDs over the Internet wherein the condition of the CD may be simply quantified by the seller, with the offer price adjusted in accordance with the condition;

To increase the economic effectiveness to the purchaser, it is an object of the present invention that a seller be required to sell a specified minimum number of CD's, or more, per transaction;

To make the system simple to use and to preclude price shopping on a per-CD basis, it is a further object of the invention that the CD seller is only quoted a total price for the complete transaction, rather than a separate price for each CD.

DRAWING SUMMARY

The invention is herein described, by way of example only, with reference to the accompanying drawings, wherein:

FIGS. 3 and 4 illustrate an example of how the used CD seller identifies a CD to be sold from the on-line database;

FIG. 5 illustrates how the used CD seller quantifies the condition of the CD;

FIG. 6 illustrates the "quote" form presented to the used CD seller after the seller has entered a single CD;

FIG. 7 illustrates the "quote" form presented to the used CD seller after the seller has entered multiple CDs, but fewer than the minimum required for a quote;

FIG. 8 illustrates the "quote" form presented to the used CD seller after the seller has entered a sufficient number of CDs for a quote;

FIG. 9 illustrates the completed quote presented to the used CD seller, and the form for entry of seller's name and address information.

CONCEPT OF THE INVENTION

Figure 1A:
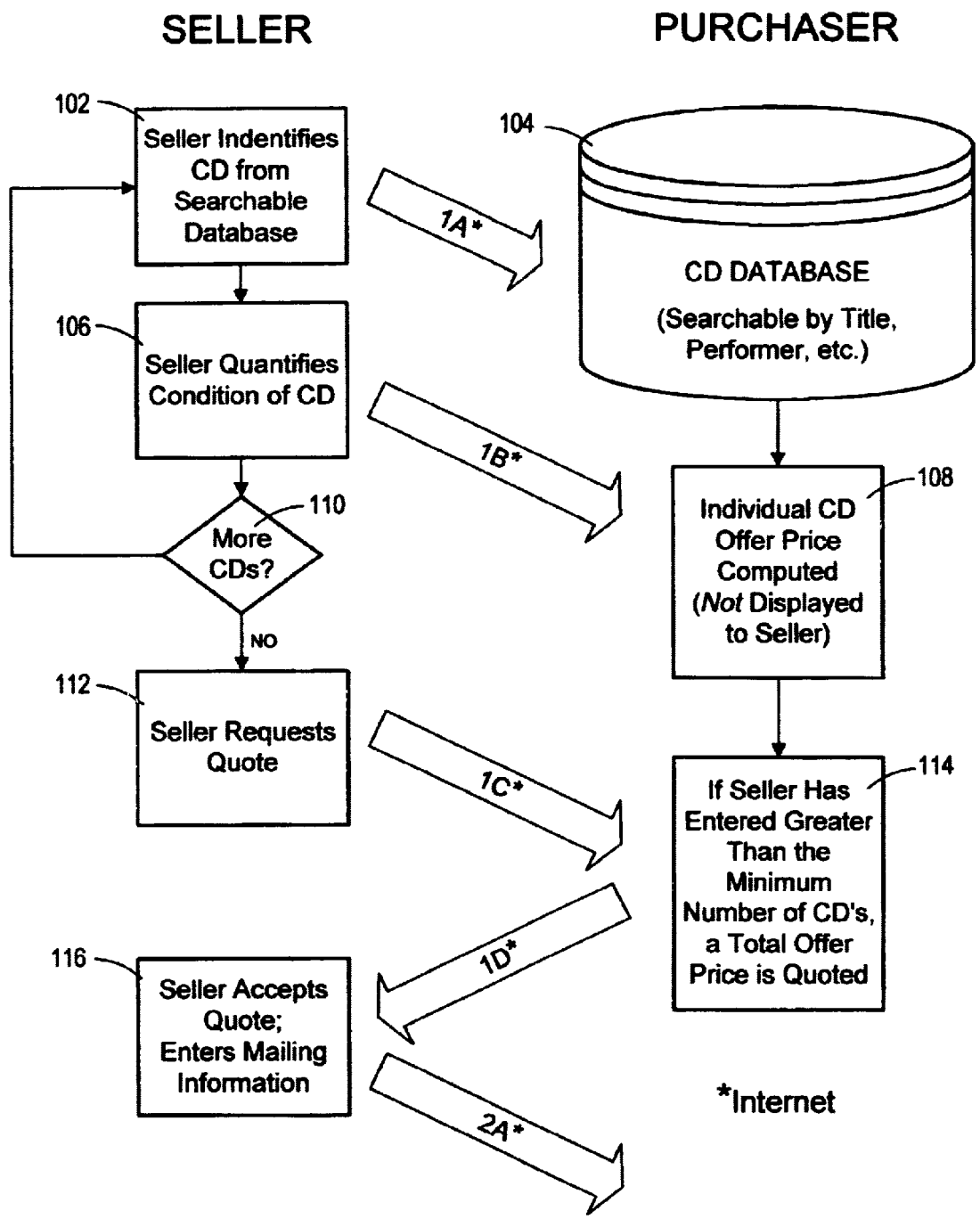
FIGS. 1a and 1b are schematic block diagram of the system and method for the purchase of used compact disks over the internet of the present invention.
Figure 1B:
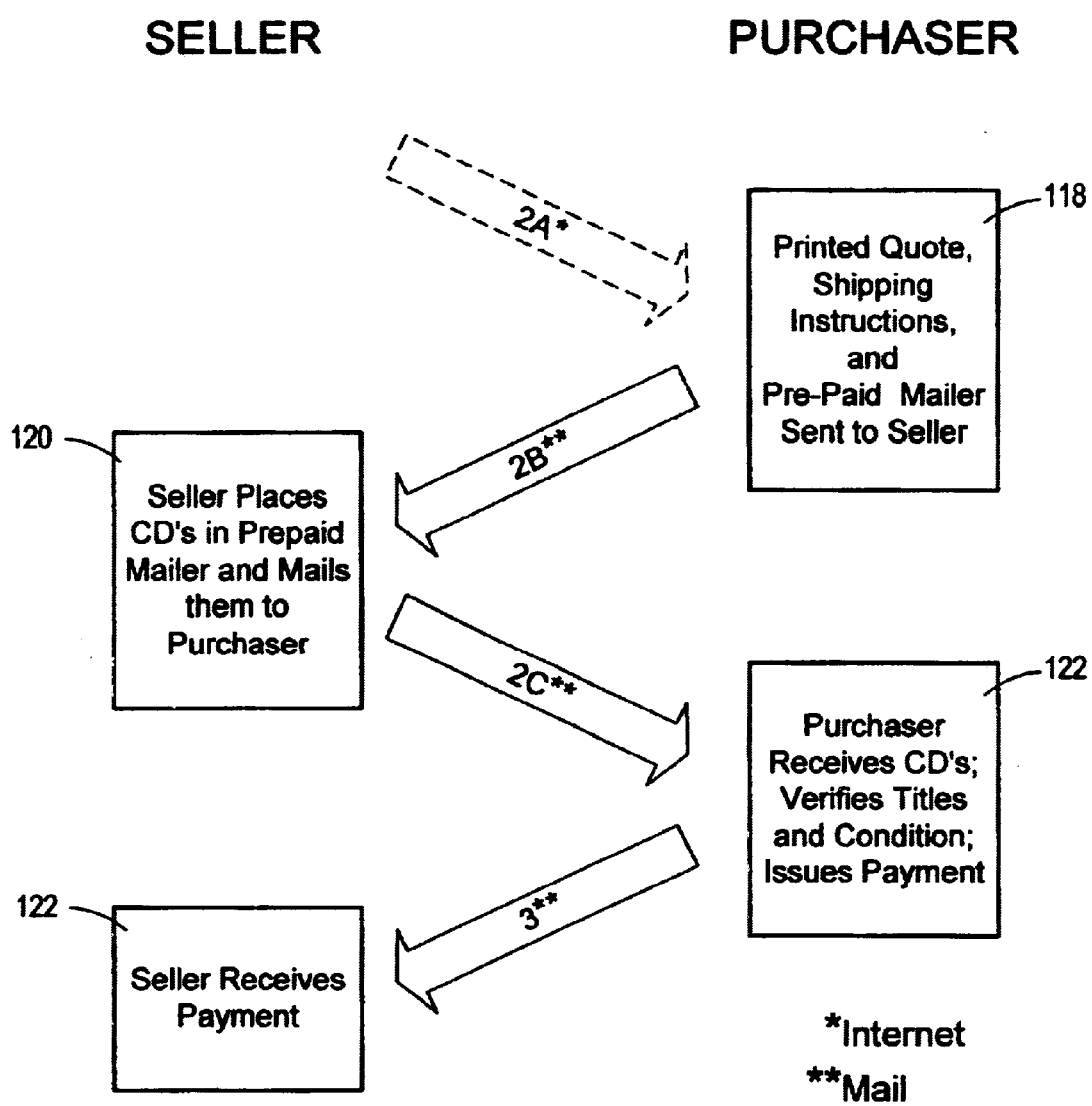

FIGS. 1a and 1b illustrate the basic concept of the system and method of the present invention. The seller, having navigated their web browser to the purchaser's Internet website, begins 102 by searching (1A) the database 104 maintained by the purchaser for the specific CD title the seller wishes to sell. Having identified the specific CD title, the seller then quantifies (1B) the condition 106 of the CD, using criteria defined on the purchaser's website, as discussed more fully below.

Once the particular CD has been identified and its condition quantified, software at the purchaser's site computes an offer price for the CD 108, generally based on the list price of the CD and the quantified condition, as explained below. The software may also include provisions for handling special cases where it may be desirable to set an offer price based on other criteria, or to manually set a price for certain CDs. The offer price for the individual CD is not displayed to the seller, but is kept private by the purchaser'site.

If the seller has additional CDs to sell the seller repeats 110 the above process for each CD (a notice on the purchaser's "start" or "home", screen informs the seller that a certain minimum number of CDs must be offered for sell before an offer to buy will be made). Once the seller has entered all the CDs they wish to sell and the minimum number has been met or exceeded, the seller requests (1C) a quote 112.

Having received the request for a quote, the software at the purchaser's site sums the individual offer prices for the CDs selected, and displays (1D) a total price to the seller 114. The seller may then accept (2A) the quote 116 and enter the necessary name and address information for the purchaser to generate a mailing label.

Off line, the purchaser's software uses the entered information to print the quote, shipping instructions, and a mailing label for mailing (2B) the quote and a pre-paid mailer to the seller 118. Upon receiving the mailer, the seller places the CDs in the mailer for shipment (2C) to the purchaser 120. To reduce the cost of mailing and because they are likely to have been damaged or worn by use, the seller may be requested to send only the CDs and printed material from the CD package, and not the CD "jewel" box. Also to reduce costs, the seller may be requested to re-use the padded envelope in which the quote and instructions were mailed to the seller, by placing a pre-printed pre-paid self-stick label over the original mailing label.

The purchaser receives the CDs by mail 122, verifies the titles and the condition of the CDs, and issues (3) a check which is mailed to the seller. The seller receives and cashes the check 124, completing the transaction.

DETAILED DESCRIPTION OF THE INVENTION

Figure 2:
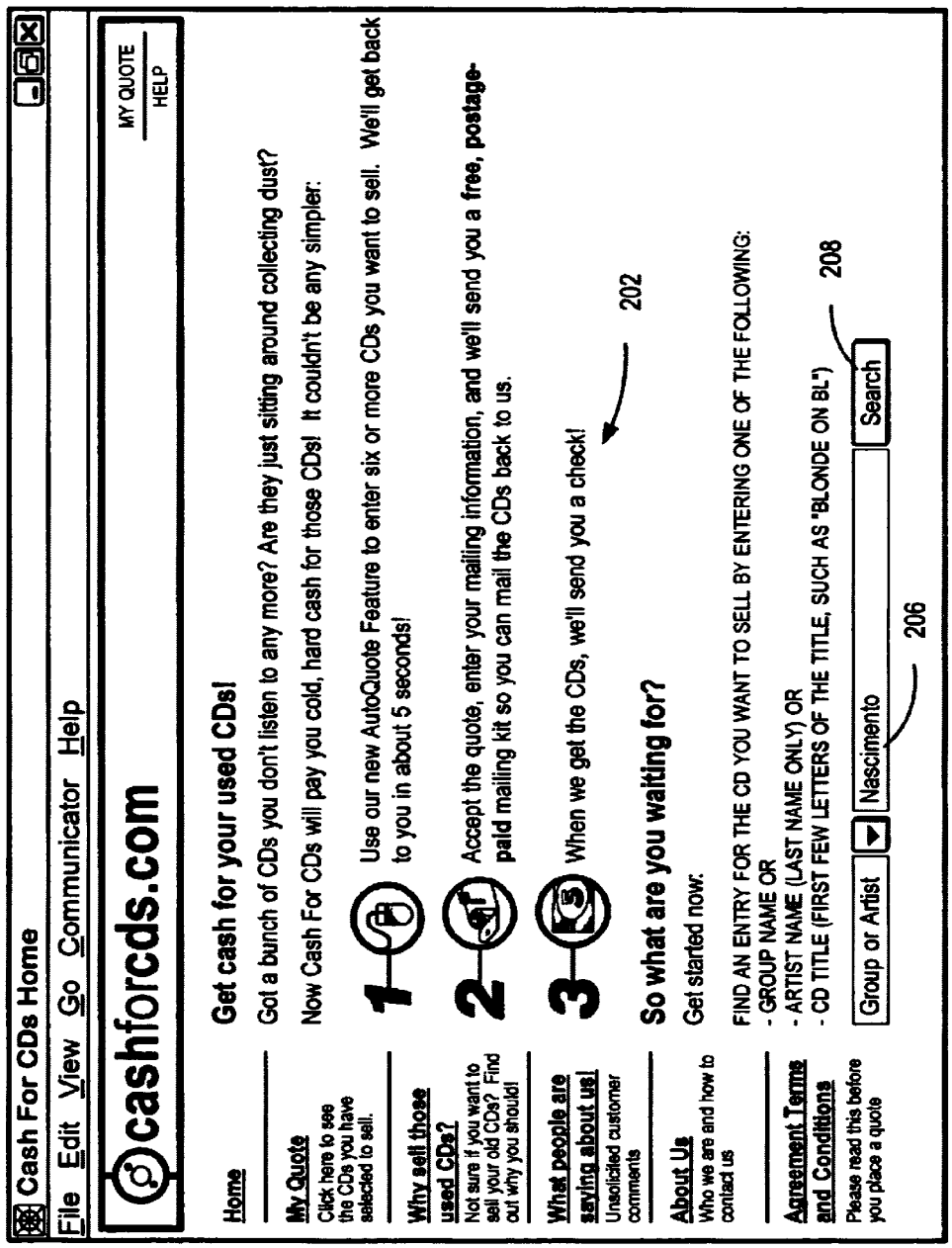
FIG. 2 illustrates the "home" or start screen presented to the internet site visitor.

FIGS. 2 through 9 illustrate the system of the present invention as viewed by a seller accessing the purchaser's website. As shown in FIG. 2, the "home" page contains simple instructions to the seller on how to use the site 202, and links to additional information about the purchaser, and terms and conditions regarding the purchase of used CDs 204. After reading the instructions, the seller begins by initiating a search for a particular group, artist, or CD title. In the example illustrated in FIG. 2, the seller has entered the artist name "Nascimento" 206, and then clicks the "Search" button 208.

The basic information used to create the CD database is obtained from a commercial source, such as that at ftp://bbs.pconestop.com/catalogs, which is then modified or updated as required by the purchaser. FIG. 3 shows the results of the seller's search. The search engine on the purchaser's site has identified three matches to the name "Nascimento"; the seller proceeds by clicking on the appropriate name (for purposes of the example, "Milton") 302.

The search engine on the purchaser's site then presents the seller with a list of all CD titles for the selected group or artist, as shown in FIG. 4. The seller selects the appropriate title (for purposes of the example, "Miltons"), 402.

Next, the seller is asked to quantify the condition of the CD, as shown in FIG. 5. The seller is presented with a ranked list of conditions, such as "Fair", "Good", and "Excellent"; a short descriptive narrative 502 next to each rank aids the seller in assigning the appropriate rank to the CD. For example, if the CD surface has "a small light scuff/mark or two", the seller assigns a rank of "Good". Based upon the database list price of the CD and the condition ranking, the purchaser site software computes an offer value for the individual CD, but does not display the individual offer price to the seller. The use of seller-ranking of the condition of the CD is an significant feature of the present invention.

FIG. 6 illustrates the "quote" presented to the seller after the entry of one CD title. It may be observed in FIG. 6 that no offer price is displayed for the single CD.

The seller repeats the above process for each CD the seller wishes to sell. FIG. 7 illustrates an example where the seller has entered a total of four CD titles. Since the seller is required to enter more than a minimum number of CDs to obtain a quote (in the example illustrated the seller must enter six or more CD titles), FIG. 7, like FIG. 6, does not show a quote price.

FIG. 8 illustrates the "quote" presented to the seller when the minimum number of CDs has been entered. A "Get Quote" button 802 appears, permitting the seller to obtain a total quoted price on the CDs entered. Alternatively, the seller may continue entering CD titles, or may remove one or more CD titles already entered. While the seller must enter more than a specified minimum number of CD titles to obtain a quote, no upper limit is placed on the number of CD titles which may be entered.

If the seller selects the "Get Quote" button in FIG. 8, a "Completed Quote" is presented, as illustrated in FIG. 9. The completed quote lists the CD titles selected by the seller, the condition of each CD, and a total dollar value for all the CDs 902. It is a further significant feature of the present invention that a dollar value is presented to the seller only for a completed quote comprising more than a fixed minimum number of CDs, rather than presenting a quoted value for each individual CD.

The seller is prompted to enter his or her name and address information; when complete, the seller selects "Send Me My Money" 904, completing the on-line interactive portion of the transaction. The remaining steps in the transaction take place through the mail, with e-mail confirmation messages. At each significant step of the off-line portion of the process, the software at the purchaser's site will generate e-mail messages to the seller's e-mail address, informing the seller of the current status of the transaction. The first e-mail includes a copy of the quote, and the stated terms of the transaction. For the example illustrated in FIGS. 2–9, the message would typically be as follows:

Thanks for using Cash For CDs!

We have quoted you on the following CDs:

1) KRALL*DIANA—STEPPING OUT (1993) (In Excellent condition)
2) NASCIMENTO*MILTON—MILTONS (In Good condition)
3) SIBERRY*JANE—NO BORDERS HERE (In Excellent condition)
4) TYNER*MCCOY—ECHOS OF A FRIEND (In Good condition)
5) UPSHAW*DAWN—KNOXVILLE SUMMER '15 (In Good condition)
6) WILLIAMS*JESSICA—INVENTIONS (In Good condition)

The total price for all CDs listed is $15.00

Information will be sent to:

Clarence D. Sellers 2001 Main Street Springfield Calif. 99999

Thanks again, and visit us again soon at http://www.cashforcds.com!

AGREEMENT TERMS AND CONDITIONS

1) Due to inventory and database changes, CashforCDs.com reserves the right to buy or not buy any CDs for which we have provided a quote.
2) All conditions of CDs quoted are subject to our review. If the conditions don't actually match the conditions that were listed in the quote, CDs will be returned to the customer at the customer's expense.
3) Quotes are given for a minimum of six CDs. CashforCDs.com cannot buy more than two CDs of the same title from the same customer.
4) CDs MUST be in working condition and MUST INCLUDE THE FRONT COVER for copyright purposes.
5) CDs with missing back covers will be accepted, but at a reduced rate.
6) This offer is available only in the US.
7) The Terms and Conditions of this Agreement are subject to change at any time without prior notice.

Offline, the purchaser then generates a mailing list, shipping instructions, and a prepaid mailing label, which is mailed to the seller's address; an e-mail message is also sent to the seller:

Just a quick status note:

We have sent you a postage-paid mailer and checklist you can use to send the CDs to us. You should be receiving this package soon. Please follow the instructions inside to complete the process.

Again, thanks for using Cash For CDs!

The seller packages the compact disks and printed inserts in the provided envelope (without the "jewel boxes"), and places the pre-paid mailing label on the envelope. When the envelope is received by the purchaser, a third confirming e-mail message is sent:

It's us again!

We just wanted to let you know we have received your CDs and we are processing them now. As soon as that's done, we'll be sending your check!

Again, thanks for using Cash For CDs!

The purchaser verifies the CD titles and conditions, prepares and mails a check for the agreed total purchase price, and sends a final e-mail message:

Just wanted to let you know that your check has been mailed! Please look for it to arrive soon.

Again, thanks for using Cash For CDs!

DESCRIPTION OF THE PRESENTLY PREFERRED IMPLEMENTATION

Figure 10:
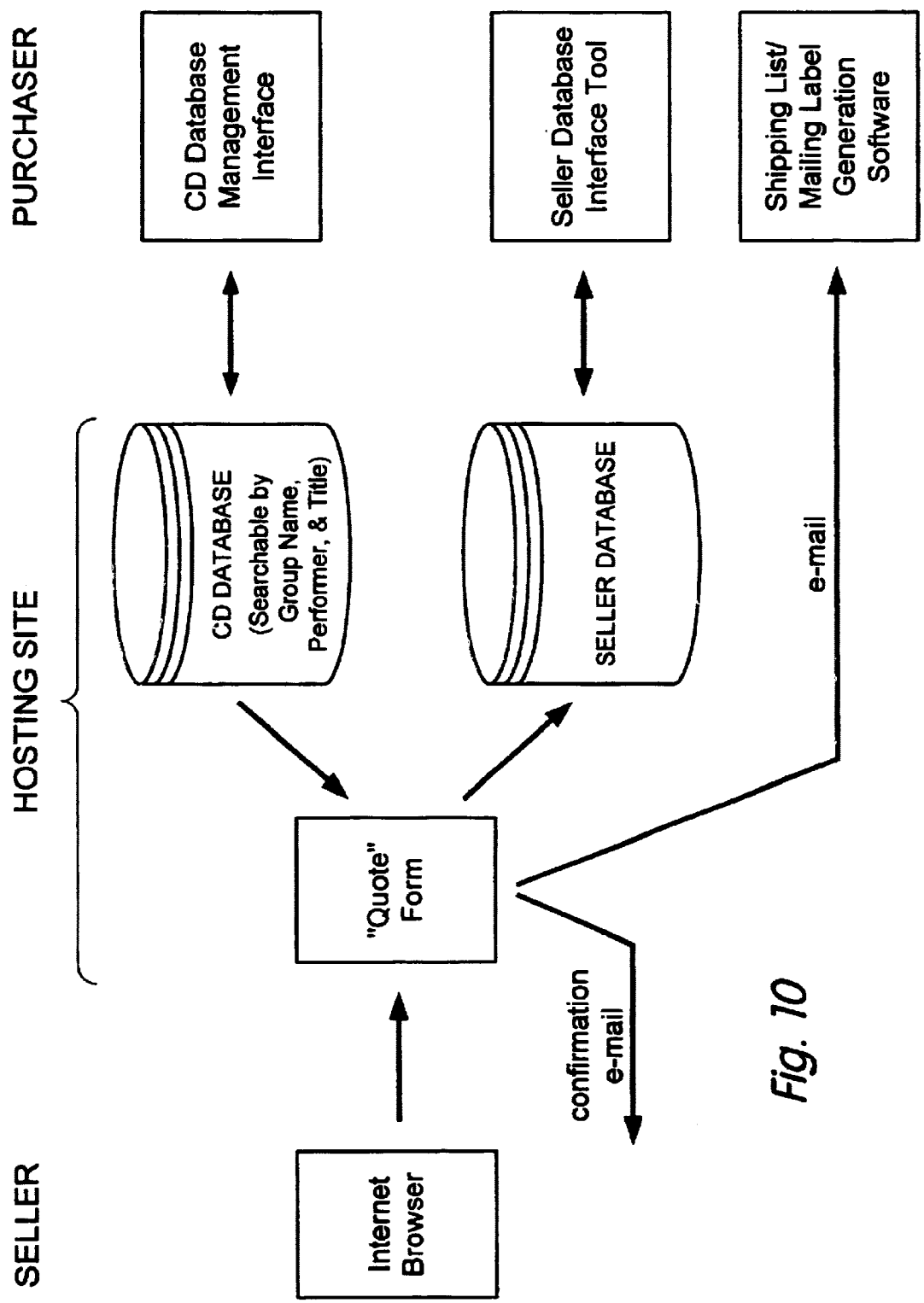
FIG. 10 is a block diagram illustrating major software components and the flow of information in the presently preferred implementation of the invention.

FIG. 10 illustrates the major software components of the presently preferred implementation, and the flow of information between the components.

The major components of the software, including the "quote" form, the CD Database, and the Seller Information Database, reside on a commercial hosting site. The seller uses a standard "web browser" to access the site. The purchaser maintains the CD Database with a database management tool from a local computer at the purchaser's location, and accesses the Seller Database as necessary with a simple interface tool. Also at the purchaser's location is software to generate the shipping list and mailing label based on information e-mailed from the hosting site.

The software on the hosting site is written is a common language such as perl, and is "open architecture", such that it may be enhanced or used in conjunction with other "e-commerce" software, Quickbooks, or other software with inventory tracking and accounting capabilities.

In the presently preferred implementation, the quote given will be based on a product of the CD list price and its condition (e.g., Excellent=20% of list price, Good=15% of list price, Fair=10% of list price). These parameters are not hard-coded into the software, but may changed as desired. The software is capable of handling exceptions where a different formula is used for some specified CDs, or a fixed price is used.

If some titles cannot be found in the database query, those CDs will not be given a quote.

The software at the hosting site accumulates a database of all site visitors' information that has been collected from the quote forms. The Seller Database Interface Tool at the purchaser's location allows the purchaser to retrieve this information as a database or in other useful formats.

CONCLUSION

The above is a detailed description of particular embodiments of the invention. It is recognized that departures from the disclosed embodiments may be within the scope of this invention and that obvious modifications will occur to a person skilled in the art. It is the intent of the applicant that the invention include alternative implementations known in the art that perform the same functions as those disclosed. This specification should not be construed to unduly narrow the full scope of protection to which the invention is entitled.

Specifically, although the invention is described primarily with respect to the purchase of used compact disks, the system and method of the invention are also applicable to the purchase other used items from consumers, such as DVD's. The database may also be configured to permit other searching methodologies, such as searching by SKU number.

The corresponding structures, materials, acts, and equivalents of all means or step plus function elements in the claims below are intended to include any structure, material, or acts for performing the functions in combination with other claimed elements as specifically claimed.

What is claimed is:

1. A method of purchasing used compact disks from individual sellers over the Internet, comprising the steps of:
   a) providing a website including an on-line searchable database of compact disk titles adapted to be accessed over the Internet by potential individual sellers to identify the compact disks to be sold, the database also including list price information for each compact disk title, the list price information not accessible to the potential sellers;
   b) when a potential seller accesses the website, the website notifying the potential seller that, to receive a price quote, the potential seller must offer to sell at least a predetermined minimum number of compact disks, the predetermined minimum number greater than one;
   c) for each used compact disk the potential seller desires to sell, the website performing the steps of:
      1) prompting the potential seller to identify the compact disk title from the database;
      2) prompting the potential seller to select from a list of statements characterizing the physical condition of the compact disk that statement which best-indicates the condition of the compact disk to be sold;
      3) computing from the list price information and the indicated condition of the compact disk an offer price for the individual compact disk, but not disclosing the computed individual compact disk price to the potential seller;

d) after the potential seller has entered at least the predetermined minimum number of compact disks, the website performing the steps of:
  1) computing a total offer price from the individual compact disk prices and presenting the total offer price, but not the individual prices, to the potential seller for acceptance;
  2) if the seller accepts the total offer price, prompting the seller to enter mailing address information;
  3) notifying the seller of the final terms of the transaction; and e) completing the transaction off-line by sending the seller a prepaid mailer.

2. A method of purchasing used mass-market removable media from individual sellers over the Internet, comprising the steps of:

a) providing a website including an on-line searchable database of mass-market removable media titles, the website adapted to be accessed over the Internet by potential individual sellers to identify the removable media to be sold, the database also including list price information for each removable media title, the list price information not accessible to the potential sellers;

b) when a potential seller accesses the website, the website notifying the potential seller that, to receive a price quote, the potential seller must offer to sell at least a predetermined minimum number of used removable media, the predetermined minimum number greater than one;

c) for each used removable media title the potential seller desires to sell, the website performing the steps of:
  1) prompting the potential seller to identify the removable media title from the database;
  2) prompting the potential seller to select from a list of statements characterizing the physical condition of the removable media that statement which best indicates the condition of the removable media to be sold;
  3) computing from the list price information and the indicated condition of the removable media an offer price for the individual removable media, but not disclosing the computed individual removable media price to the potential seller;

d) after the potential seller has entered at least the predetermined minimum number of removable media, the website performing the steps of:
  1) computing a total offer price from the individual removable media prices and presenting the total offer price, but not the individual prices, to the potential seller for acceptance;
  2) if the seller accepts the total offer price, prompting the seller to enter mailing address information; and
  3) informing the seller of the final terms of the transaction.

3. The method of purchasing used mass-market removable media from individual sellers over the Internet of claim 2, wherein the removable media contain audio recordings.

4. The method of purchasing used mass-market removable media from individual sellers over the Internet of claim 3, wherein the removable media comprise compact disks.

5. The method of purchasing used mass-market removable media from individual sellers over the Internet of claim 2, wherein the removable media contain video recordings.

6. The method of purchasing used mass-market removable media from individual sellers over the Internet of claim 5, wherein the removable media comprise digital versatile disks.

7. The method of purchasing used mass-market removable media from individual sellers over the Internet of claim 2, further comprising the step of completing the transaction off-line by sending the seller a prepaid mailer.

* * * * *